United States Patent [19]

Saito et al.

[11] 4,225,221
[45] Sep. 30, 1980

[54] COCKING MECHANISM FOR ELECTRIC SHUTTERS

[75] Inventors: Toshihisa Saito, Tokyo; Nobuyoshi Inoue, Kawagoe, both of Japan

[73] Assignee: Copal Company Limited, Tokyo, Japan

[21] Appl. No.: 963,946

[22] Filed: Nov. 27, 1978

[30] Foreign Application Priority Data

Dec. 1, 1977 [JP]  Japan ............................... 161654[U]
Dec. 1, 1977 [JP]  Japan ................................ 16155[U]

[51] Int. Cl.$^3$ ........................... G03B 9/08; G03B 9/66; G03B 17/38
[52] U.S. Cl. ................................... 354/234; 354/235; 354/266
[58] Field of Search ............... 354/234, 235, 238, 258, 354/266, 267

[56] References Cited

U.S. PATENT DOCUMENTS

| | | | |
|---|---|---|---|
| 3,241,471 | 3/1966 | Burgarella | 354/266 X |
| 4,106,040 | 8/1978 | Ito et al. | 354/234 X |

FOREIGN PATENT DOCUMENTS

| | | | |
|---|---|---|---|
| 1244565 | of 1967 | Fed. Rep. of Germany | 354/267 |
| 1253040 | of 1967 | Fed. Rep. of Germany | 354/267 |
| 2447535 | of 1975 | Fed. Rep. of Germany | 354/266 |
| 1187724 | of 1970 | United Kingdom | 354/267 |

Primary Examiner—L. T. Hix
Assistant Examiner—Shelley Wade
Attorney, Agent, or Firm—Cushman, Darby & Cushman

[57] ABSTRACT

A cocking mechanism for electric focal plane shutters arranged so that, in order to simplify the cocking mechanism, while a shutter opening controlling armature lever is brought to the cocked position from the uncocked position, a shutter closing controlling armature lever may be brought to the cocked position from the uncocked position by the shutter opening controlling armature lever and, when the shutter opening controlling lever is locked in the cocked position, the shutter closing controlling armature lever may be held in the cocked position.

1 Claim, 3 Drawing Figures

COCKING MECHANISM FOR ELECTRIC SHUTTERS

BACKGROUND OF THE INVENTION (a) Field of the invention:

This invention relates to electric shutter mechanisms and more particularly to improvements in a cocking mechanism for electric local plane shutters. (b) Description of the Prior Art:

Conventional electric focal plane shutters may be divided broadly into (a) a type wherein the front shutter blade is mechanically controlled and the rear shutter blade is controlled by an electromagnet and (b) another type wherein each of the front and rear shutter blades is controlled by an electromagnet. Further, the shutters of the above mentioned type (b) may be divided into (c) a type wherein the front and rear shutter blades are controlled by a single electromagnet and (d) another type wherein the front and rear shutter blades are controlled respectively by two independent electromagnets. Still further, the shutters of the above mentioned type (d) may be divided into (e) a type wherein the shutter blade driving means are released by energizing the electromagnet including a permanent magnet so that the resultant magnetic field becomes nil and (f) another type wherein the shutter blade driving means are released by energizing the electromagnet to produce an attractive force.

The structural features of conventional electric focal plane shutters may be different from one another due to the type of the electromagnet to be used. Accordingly, the type of the electromagnet to be used is selected in accordance with the purpose of use of the camera.

However, there is not yet suggested an electric focal plane shutter of the above mentioned type (f) wherein an armature lever is released when an electromagnet is de-energized, the lock of the blade driving means is released by the said action of the armature lever and the armature lever is pressed against the electromagnet while resisting a spring force by the shutter cocking operation. In such an electric focal plane shutter in which the shutter cocked state is held by the attraction of the electromagnet, there will be required a cocking member for bringing the armature lever to the cocked position from an uncocked position and a holding member for pressing the armature lever against the electromagnet in the cocked state until the electromagnet is energized. This holding member must be retreated out of the moving track of the armature lever before the electromagnet is again de-energized. Therefore, in an electric focal plane shutter of a type of controlling the shutter opening and closing with the cooperation of the electromagnet and armature lever, a cocking member and holding member will be required for each armature lever and each holding member must be moved as mentioned above. This fact not only complicates the shutter mechanism but is also likely to cause a misoperation. It is likely to be influenced by errors in working and assembling parts and has been often possible to fail.

SUMMARY OF THE INVENTION

An object of the present invention is to solve the above mentioned defects in an electric shutter of a type wherein the shutter opening and closing are controlled by the cooperation of the respective electromagnets and armature levers.

This object, according to the present invention, is attained by engageably arranging a shutter opening controlling armature lever and a shutter closing controlling armature lever so that, when the shutter opening controlling armature lever is brought to the cocked position from the uncocked position, the shutter closing controlling armature lever may be brought to the cocked position from the uncocked position by the shutter opening controlling armature lever.

According to the preferred formation of the present invention, when the shutter opening controlling armature lever is locked in the cocked position by a release lever, the shutter closing controlling armature lever will be held in the cocked position by the shutter opening controlling armature lever.

This and other objects of the present invention will become more apparent during the course of the following detailed description and appended claims.

DESCRIPTION OF THE PREFERRED EMBODIMENTS

Figure 1:
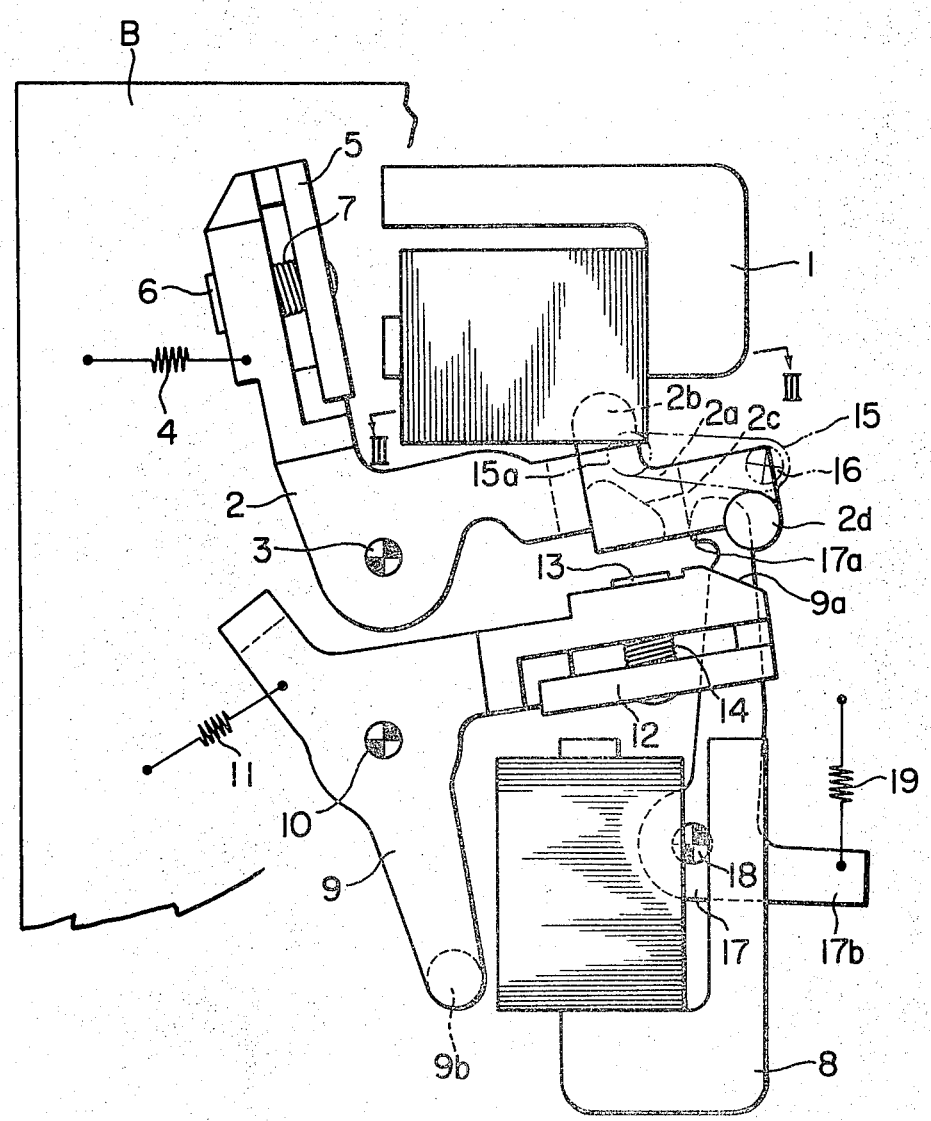
FIG. 1 is a plan view of an important part of an electric local plane shutter cocking mechanism according to the present invention in which it is in the uncocked state.

With reference to the drawings, reference numeral 1 indicates a shutter opening controlling electromagnet fixed on a base plate B and 2 indicates a shutter opening controlling armature lever which is pivoted on a shaft 3 provided on the base plate B, is biased counterclockwise by a spring 4 and has a stepped portion 2a, a projecting portion 2b for operating a front blade locking lever not illustrated, a slope 2c projecting below them and a pin 2d. Reference numeral 5 indicates an armature piece which can contact the electromagnet 1 and is supported somewhat rockably with respect to the armature lever 2 through a compression coil spring 7 by a supporting shaft 6. 8 indicates a shutter closing controlling electromagnet fixed on the base plate B. 9 indicates a shutter closing controlling armature lever which is pivoted to a shaft 10 provided on the base plate B, is biased counterclockwise by a spring 11 and has a slope 9a able to be pushed and moved by the pin 2d of the armature lever 2 and a pin 9b for operating a rear blade locking lever not illustrated. 12 indicates an armature piece which can contact the electromagnet 8 and is supported somewhat rockably with respect to the armature lever 9 through a compression coil spring 14 by a supporting shaft 13. 15 indicates a cocking lever which is pivoted to a shaft 16 provided on the base plate B and has a pin 15a able to be engaged with the slope 2c of the armature lever 2. The cocking lever 15 is so made as to be able to set also a front blade driving member and rear blade driving member not illustrated. 17 indicates a release lever which is pivoted to a shaft 18 provided on the base plate B, is biased counterclockwise by a spring 19 and has a hook 17a engageable with the stepped portion 2a of the armature lever 2 and an arm 17b.

The operation of the above mentioned mechanism shall be explained in the following.

When the cocking lever 15 is rotated counterclockwise from the uncocked state, in FIG. 1, the front blade driving member and rear blade driving member not illustrated will be rotated and will be locked respectively by the front blade locking lever and rear blade locking lever not illustrated. With the counterclockwise rotation of the cocking lever 15, the pin 15a will rotate counterclockwise around the shaft 16, will push the slope 2c and will clockwise rotate the armature lever 2 against the tension of the spring 4. The armature lever 2 will push the slope 9a of the armature lever 9 with the pin 2d on the way of its clockwise rotation and will clockwise rotate the armature lever 9 against the tension of the spring 11. When the stepped portion 2a is opposed to the hook 17a of the release lever 17 on the way of the clockwise rotation of the armature lever 2, the release lever 17 will be rotated counterclockwise by the tension of the spring 19 and the hook 17a will be located within the track of the stepped portion 2a. At this time, the armature pieces 5 and 12 will have already contacted respectively the electromagnets 1 and 8 (see FIG. 2). Then, the cocking lever 15 will be further somewhat counterclockwise rotated but the clockwise rotation of the armature levers 2 and 9 in this stage will be absorbed by the compression coil springs 7 and 14. When the cocking operation is thus completed, the cocking lever 15 will return to the position in FIG. 1 and, as shown in FIG. 2, the over-rotated armature lever 2 will somewhat counterclockwise rotate, the stepped portion 2a will be locked by the hook 17a of the release lever 17 and the armature lever 9 will be restrained on the slope 9a by the pin 2d of the armature lever 2.

Figure 2:
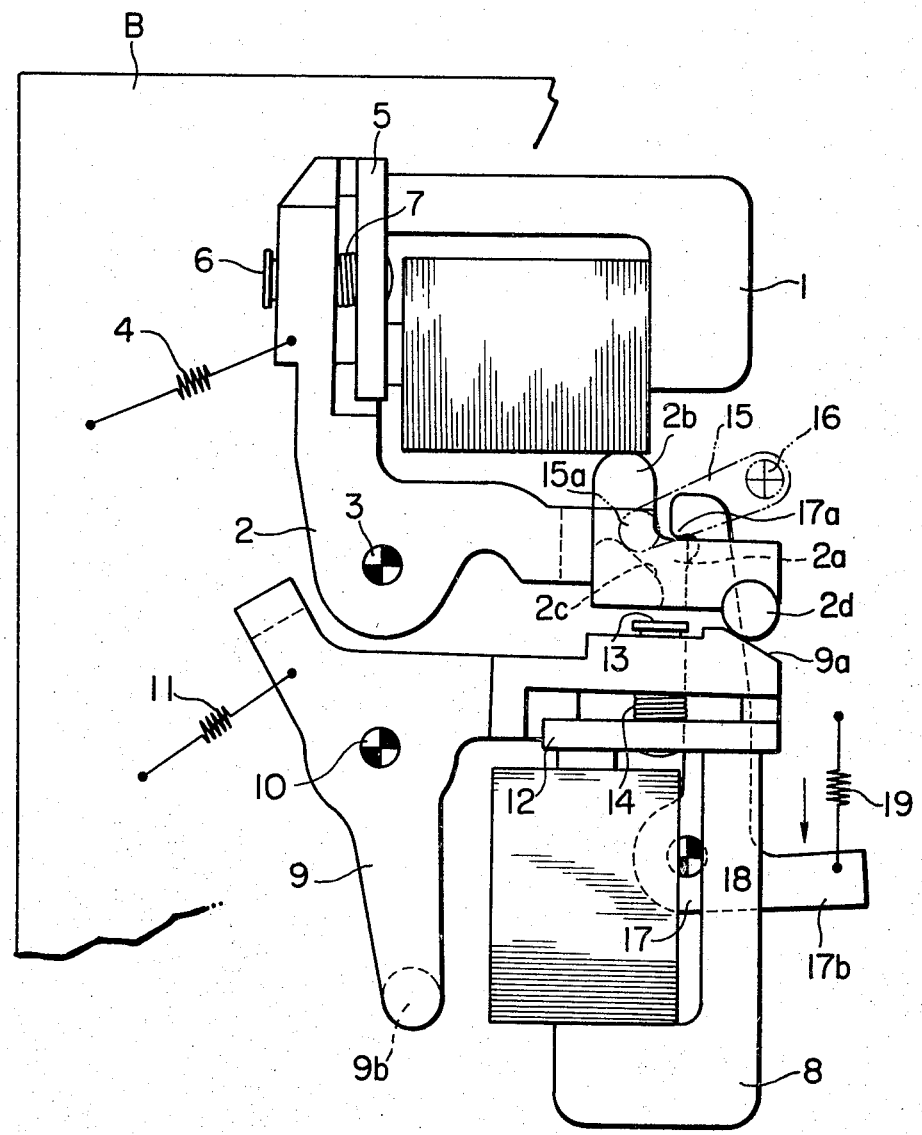
FIG. 2 is a plan view of the important part of the cocking mechanism in FIG. 1 in which it is in the cocked state.
Figure 3:
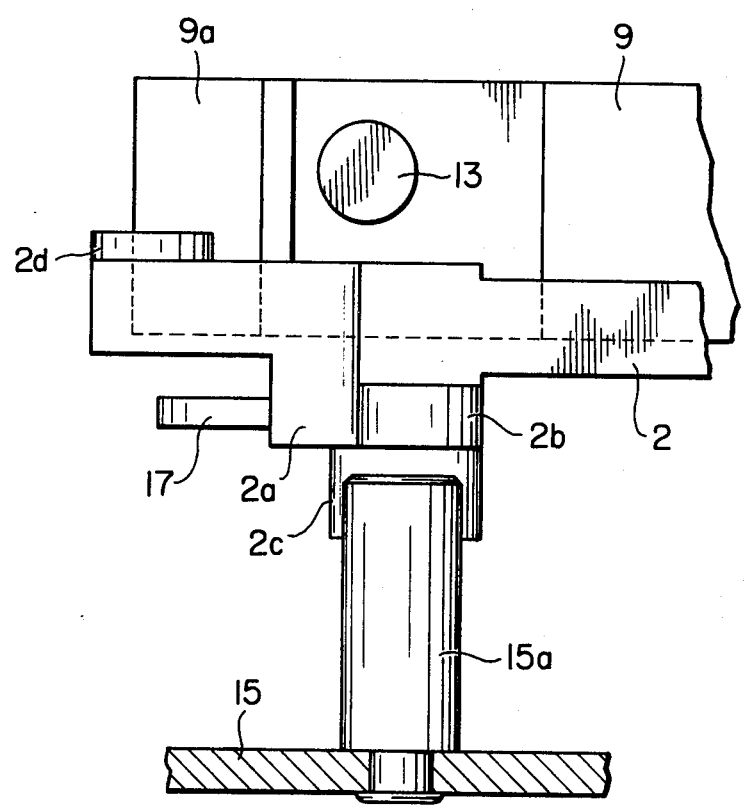
FIG. 3 is a partial sectional view along line III—III in FIG. 1.

In photographing, when a release button not illustrated is pushed, first a current source switch not illustrated will be closed, both electromagnets 1 and 8 will be energized and the armature pieces 5 and 12 will be held in the cocked positions in FIG. 2 by the attraction of the electromagnets 1 and 2. When the arm 17b of the release lever 17 is pushed and moved in the direction indicated by the arrow in FIG. 2 by the next stroke of the release button, the release lever 17 will be rotated clockwise against the tension of the spring 19 and the hook 17a will be disengaged from the stepped portion 2a. Therefore, the armature lever 2 will rotate slightly counterclockwise in the range corresponding to the elongation of the coil spring 7. Further, by the displacement of the pin 2d with the counterclockwise rotation of the armature lever 2, the armature lever 9 will also rotate slightly counterclockwise in the range corresponding to the elogation of the coil spring 14. It is designed in advance that some clearance will be produced between the pin 2d and slope 9a in this state to not transmit the restoring force of the spring 14 to the armature lever 2. When the electromagnet 1 is then de-energized by appropriate means, the armature lever 2 will be rotated counterclockwise by the tension of the spring 4. As a result, the projecting portion 2b will operate the front blade locking lever not illustrated to release the front blade driving member, therefore the front blades will be opened and the counting of the exposure time will be started by an exposure time controlling circuit not illustrated. When the electromagnet 8 is de-energized with the lapse of a proper exposure time, the armature lever 9 will be counterclockwise rotated by the tension of the spring 11. As a result, the pin 9b will operate the rear blade locking lever not illustrated to release the rear blade driving member and therefore the rear blades will be closed.

By the above operation, one exposing action will be completed and all the elements will return to the state in FIG. 1.

In the embodiment, the shutter opening controlling armature lever 2 performs a function as of a cocking member for the shutter closing controlling armature lever 9. However, the armature lever 2 may be located in the position in which the motion of the armature lever 9 can be restrained when the cocking is completed. The cocking member for the armature lever 9 may be provided separately.

We claim:

1. A cocking mechanism for electric focal plane shutters, comprising:
   a base plate;
   a shutter opening-controlling electromagnet fixed on said base plate and able to make an energized state and a deenergized state;
   a shutter opening-controlling armature lever rotatably supported on said base plate and able to take a cocked position in which it contacts said shutter opening-controlling electromagnet and an uncocked position in which it is separated from said shutter opening-controlling electromagnet;
   a first spring connected between said base plate and shutter opening-controlling armature lever and biasing said shutter opening-controlling armature lever to separate from said shutter opening-controlling electromagnet;
   a shutter closing-controlling electromagnet fixed on said base plate and able to take an energized state and a deenergized state;
   a shutter closing-controlling armature lever rotatably supported on said base plate and able to take a cocked position in which it contacts said shutter closing-controlling electromagnet and an uncocked position in which it is separated from said shutter closing-controlling electromagnet;
   a second spring connected between said base plate and shutter closing-controlling armature lever and biasing said shutter closing-controlling armature lever to separate from said shutter closing-controlling electromagnet;
   a cocking lever rotatably supported on said base plate and engageable with said shutter opening-controlling armature lever to bring said shutter opening-controlling armature lever into its cocked position from its uncocked position; and
   a release lever rotatably supported on said base plate and engageable with said shutter opening-controlling armature lever;
   said shutter closing-controlling armature lever being engageable with said shutter opening-controlling armature lever and being brought into its cocked position from its uncocked position by said shutter opening-controlling armature lever when said shutter opening-controlling armature lever is brought into its cocked position from its uncocked position; and
   said shutter closing-controlling armature lever being held in its cocked position by said shutter opening-controlling armature lever when said shutter opening-controlling armature lever is locked in its cocked position by said release lever;
   said shutter opening-controlling armature lever having a first armature piece rockably supported thereon and capable of contacting said shutter opening-controlling electromagnet and a third spring provided between said shutter opening-controlling armature lever and first armature piece;

said shutter closing-controlling armature lever has a second armature piece rockably supported thereon and capable of contacting said shutter closing-controlling electromagnet and a fourth spring provided between said shutter closing-controlling armature lever and second armature piece; and a clearance is produced between said shutter opening- and closing-controlling armature lever when said first and second armature pieces are respectively attracted to said shutter opening- and closing-controlling electromagnets and when said release lever disengages from said shutter opening-controlling armature lever.

* * * * *